(12) United States Patent
Scheid et al.

(10) Patent No.: US 8,744,166 B2
(45) Date of Patent: *Jun. 3, 2014

(54) SYSTEM AND METHOD FOR MULTIPLE SIMULTANEOUS AUTOMATED DEFECT DETECTION

(75) Inventors: Paul Raymond Scheid, West Hartford, CT (US); Richard C. Grant, Ellington, CT (US); Alan Matthew Finn, Hebron, CT (US); Hongcheng Wang, Vernon, CT (US); Ziyou Xiong, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/288,617

(22) Filed: Nov. 3, 2011

(65) Prior Publication Data
US 2013/0113916 A1  May 9, 2013

(51) Int. Cl.
*G06K 9/00*  (2006.01)

(52) U.S. Cl.
USPC ........................................................ 382/145

(58) Field of Classification Search
None
See application file for complete search history.

(56) References Cited

U.S. PATENT DOCUMENTS

| | | | |
|---|---|---|---|
| 5,070,401 A | 12/1991 | Salvati et al. | |
| 5,619,429 A | 4/1997 | Aloni et al. | |
| 5,774,212 A | 6/1998 | Corby | |
| 6,153,889 A | 11/2000 | Jones | |
| 6,362,875 B1 | 3/2002 | Burkley | |
| 6,424,733 B2 | 7/2002 | Langley | |
| 6,597,818 B2 * | 7/2003 | Kumar et al. | 382/294 |
| 7,099,078 B2 | 8/2006 | Spencer | |
| 7,489,811 B2 | 2/2009 | Brummel et al. | |
| 7,518,632 B2 | 4/2009 | Konomura | |
| 7,564,626 B2 | 7/2009 | Bendall et al. | |
| 7,619,728 B2 | 11/2009 | Ogburn et al. | |
| 7,656,445 B2 | 2/2010 | Heyworth | |
| 7,758,495 B2 | 7/2010 | Pease et al. | |
| 2002/0128790 A1 | 9/2002 | Woodmansee | |
| 2003/0063270 A1 | 4/2003 | Hunik | |
| 2004/0183900 A1 * | 9/2004 | Karpen et al. | 348/92 |
| 2004/0242961 A1 | 12/2004 | Bughici | |

(Continued)

FOREIGN PATENT DOCUMENTS

WO   WO 2010/020338 A1   2/2010

OTHER PUBLICATIONS

Candès, Emmanuel J., et al. "Robust principal component analysis?." arXiv preprint arXiv:0912.3599 (2009).*

(Continued)

*Primary Examiner* — Stephen R Koziol
*Assistant Examiner* — Amandeep Saini
(74) *Attorney, Agent, or Firm* — Miller, Matthias & Hull LLP

(57) ABSTRACT

A system and method for performing automated defect detection using multiple image capture devices is disclosed. The system and method may include providing a plurality of image capture devices, the plurality of image capture devices capturing and transmitting a plurality of images of an object. The system and method may further include determining a feature correspondence between the plurality of images of the plurality of image capture devices, creating mosaiced images of the plurality of images if the feature correspondence is found or known and performing at least of an automated analysis and a manual inspection on the mosaiced images to find any defects in the object.

20 Claims, 3 Drawing Sheets

(56) References Cited

U.S. PATENT DOCUMENTS

| | | |
|---|---|---|
| 2005/0016857 A1 | 1/2005 | Kovarsky et al. |
| 2005/0129108 A1 | 6/2005 | Bendall et al. |
| 2006/0050983 A1 | 3/2006 | Bendall et al. |
| 2008/0060034 A1* | 3/2008 | Egnal et al. .................. 725/105 |
| 2011/0013846 A1 | 1/2011 | Hori |
| 2011/0025844 A1 | 2/2011 | Hori |
| 2011/0026805 A1 | 2/2011 | Hori |

OTHER PUBLICATIONS

Jaillon, P., and A. Montanvert. "Image mosaicking applied to three-dimensional surfaces." Pattern Recognition, 1994. vol. 1—Conference A: Computer Vision & Image Processing., Proceedings of the 12th IAPR International Conference on. vol. 1. IEEE, 1994.*

* cited by examiner

SYSTEM AND METHOD FOR MULTIPLE SIMULTANEOUS AUTOMATED DEFECT DETECTION

TECHNICAL FIELD OF THE DISCLOSURE

The present disclosure relates to automated inspection techniques and, more particularly, relates to automated visual inspection techniques of images or videos captured by image capture devices such as borescopes.

BACKGROUND OF THE DISCLOSURE

Video inspection systems, such as borescopes, have been widely used for capturing images or videos of difficult-to-reach locations by "snaking" image sensor(s) to these locations. Applications utilizing borescope inspections include aircraft engine blade inspection, power turbine blade inspection, internal inspection of mechanical devices and the like.

A variety of techniques for inspecting the images or videos provided by borescopes for determining defects therein have been proposed in the past. Most such techniques capture and display images or videos to human inspectors for defect detection and interpretation. Human inspectors then decide whether any defect within those images or videos exists. These techniques are prone to errors resulting from human inattention. Some other techniques utilize automated inspection techniques in which most common defects are categorized into classes such as leading edge defects, erosion, nicks, cracks, or cuts. Any incoming images or videos from the borescopes are examined to find those specific classes of defects. These techniques are thus focused on low-level feature extraction and to identify damage by matching features. Although somewhat effective in circumventing errors from human involvement, categorizing all kinds of blade damage defects within classes is difficult and images having defects other than those pre-defined classes are not detected.

Accordingly, it would be beneficial if an improved technique for performing defect detection was developed. It would additionally be beneficial if such a technique were automated, thereby minimizing human intervention and did not interpret defects based upon any categorization or classes.

SUMMARY OF THE DISCLOSURE

In accordance with one aspect of the present disclosure, a method of performing automated defect detection is disclosed. The method may include providing a plurality of image capture devices, the plurality of image capture devices capturing and transmitting a plurality of images of an object. The system and method may further include determining a feature correspondence between the plurality of images of the plurality of image capture devices, creating mosaiced images of the plurality of images if the feature correspondence is found or known and performing at least one of an automated analysis and a manual inspection on the mosaiced images to find any defects in the object In accordance with another aspect of the present disclosure, a system for automated defect detection is disclosed. The system may include a plurality of image capture devices for capturing and transmitting video images of one or more components of a machine and a monitoring and analysis site in at least indirect communication with the image capture devices. The monitoring and analysis site may be capable of performing an automated analysis of the video images, the automated analysis comprising performing at least one of a feature correspondence extraction and using a priori known correspondence and selectively creating a mosaic of the video images to determine any defects in the one or more components.

In accordance with yet another aspect of the present disclosure, a method of performing automated defect detection is disclosed. The method may include providing a plurality of image capture devices capable of capturing and transmitting a sequence of images of one or more blades of an engine and extracting common features from the sequence of images. The method may also include performing at least one of a frame-to-frame registration, a frame-to-mosaic registration or concatenation to create a mosaiced image and performing an automated analysis on the sequence of images, the automated analysis comprising performing a Robust Principal Component Analysis on the mosaiced image to determine any defects in the one or more blades.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
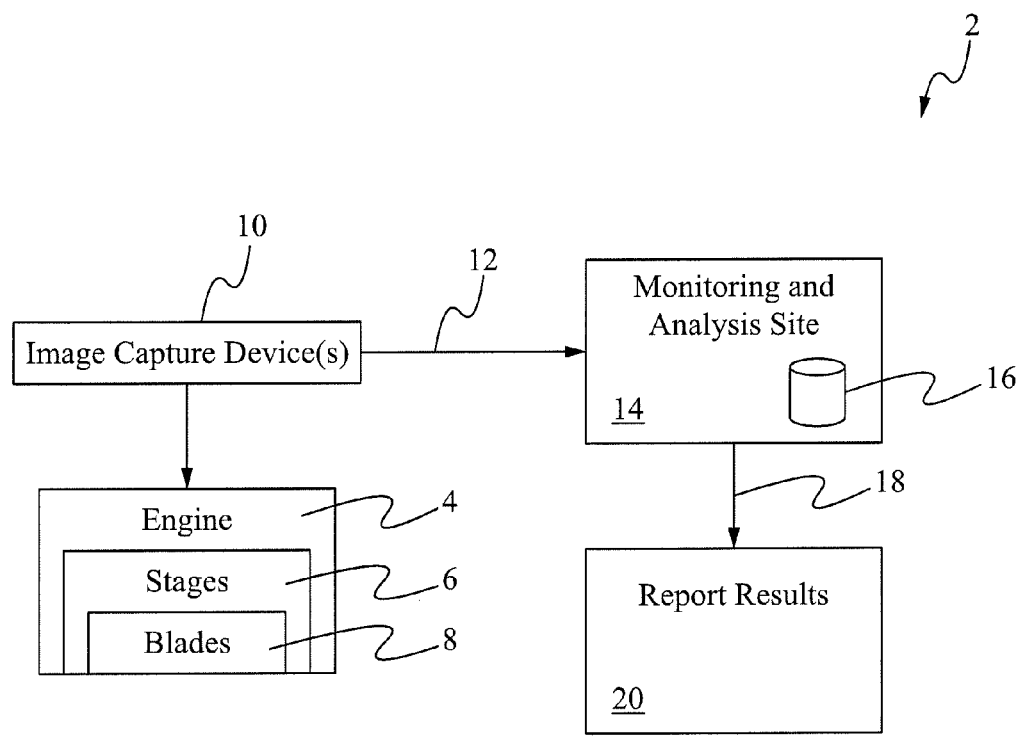
FIG. 1 is a schematic illustration of an automated defect detection system, in accordance with at least some embodiments of the present disclosure.

Referring to FIG. 1, a schematic illustration of an automated defect detection system 2 is shown, in accordance with at least some embodiments of the present disclosure. In at least some embodiments, the automated defect detection system 2 may be an automated borescope inspection (ABI) system. As shown, the automated defect detection system 2 may include an engine 4 having a plurality of stages 6, each of the stages having a plurality of blades 8, some or all of which may require visual inspection periodically at predetermined intervals, or based on other criteria by one or more image capture device(s) 10. The engine 4 may be representative of a wide variety of engines such as jet aircraft engines, aeroderivative industrial gas turbines, steam turbines, diesel engines, automotive and truck engines, and the like. Notwithstanding the fact that the present disclosure has been described in relation to visual inspection of the blades 8 of the engine 4, in other embodiments, the automated defect detection system 2 may be employed to inspect other parts of the engine inaccessible by other means, as well as to perform inspection in other equipment and fields such as medical endoscope inspection, inspecting critical interior surfaces in machined or cast parts, forensic inspection, inspection of civil structures such as buildings bridges, piping, etc.

Each of the image capture device(s) 10 may be an optical device having an optical lens or other imaging device or image sensor at one end and capable of capturing and transmitting still images or video images (referred hereinafter to as "data") through a communication channel 12 to a monitoring and analysis site 14. The image capture device(s) 10 may be representative of any of a variety of borescopes such as flexible borescopes or fiberscopes, rigid borescopes, video borescopes, or other devices such as endoscopes, which are capable of capturing and transmitting data of difficult-to-reach areas through the communication channel 12. The communication channel 12 in turn may be an optical channel or alternatively, may be any other wired, wireless or radio channel or any other type of channel capable of transmitting data between two points including links involving the World Wide Web (www) or the internet.

With respect to the monitoring and analysis site 14, it may be located on-site near or on the engine 4, or alternatively, it may be located on a remote site away from the engine. Furthermore, the monitoring and analysis site 14 may include one or more processing systems 16 (e.g., computer systems having a central processing unit and memory) for recording, processing and storing the data received from the image capture device(s) 10, as well as personnel for controlling operation of the one or more processing systems. Thus, the monitoring and analysis site 14 may receive the data of the blades 8 captured and transmitted by the image capture device(s) 10 via the communication channel 12. Upon receiving the data, the monitoring and analysis site 14 and, particularly, the one or more processing systems 16 may process that data to determine any defects within any of the blades 8. Results (e.g., the defects) 20 may then be reported through communication channel 18. In addition to reporting any defects in any of the blades 8, the results 20 may also relay information about the type of defect, the location of the defect, size of the defect, etc. If defects are found in any of the inspected blades 8, alarm(s) to alert personnel or users may be raised as well.

Similar to the communication channel 12, the communication channel 18 may be any of variety of communication links including, wired channels, optical or wireless channels, radio channels or possibly links involving the World Wide Web (www) or the internet. It will also be understood that although the results 20 have been shown as being a separate entity from the monitoring and analysis site 14, this need not always be the case. Rather, in at least some embodiments, the results 20 may be stored within and reported through the monitoring and analysis site 14 as well. Furthermore, in at least some embodiments, the results 20 may be stored within a database for future reference.

Figure 2:
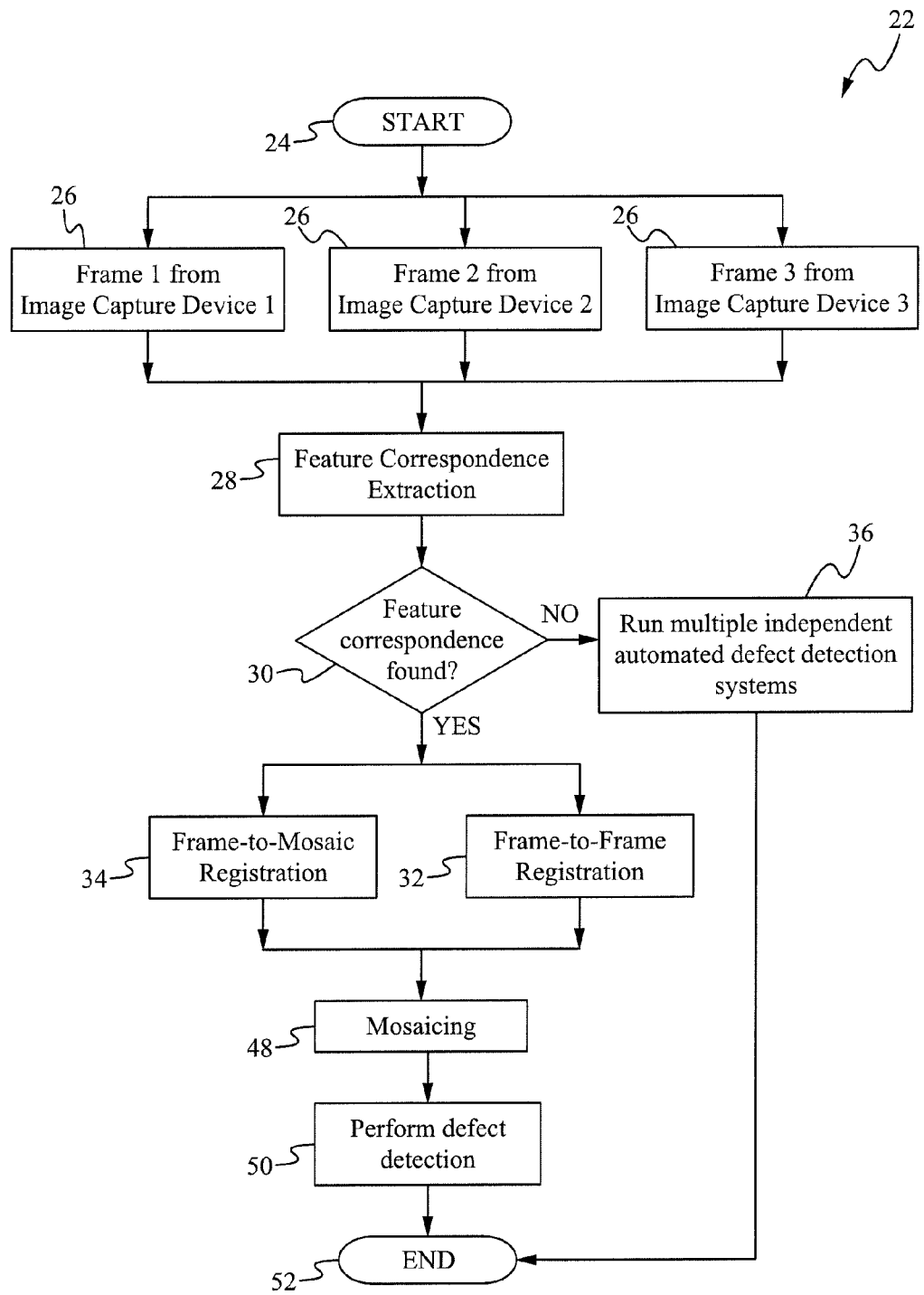
FIG. 2 is a flowchart outlining steps of performing automated defect detection using the automated defect detection system of FIG. 1, in accordance with at least some embodiments of the present disclosure.

Referring now to FIG. 2, a flowchart 22 outlining sample steps which may be followed in performing automated defect detection using the automated defect detection system 2 is shown, in accordance with at least some embodiments of the present invention. As shown, after starting at a step 24, the process may proceed to a step 26, where a sequence of images of one or more of the blades 8 may be obtained via the image capture device(s) 10. The sequence of images may be obtained from multiple image capture devices simultaneously, for example, three image capture devices as shown. It will be understood that although only three image capture devices (image capture device 1, image capture device 2 and image capture device 3) have been shown as capturing and transmitting data in FIG. 2, in at least some other embodiments, greater than three image capture devices or possibly even less than three may be employed for capturing and transmitting the sequence of images. Generally speaking, the number of image capture devices to be employed at the step 26 may vary depending upon the number of image capture devices that may be required to obtain a complete set of data pertaining to one or more of the blades 8, the stages 6, or a combination thereof, in order to correctly perform the automated defect detection of those blades.

Furthermore, in at least some embodiments, the sequence of images may be video images and each image within the video may be termed as a frame. For purposes of explanation in the present disclosure, a single frame from each of the three image capture devices is used as an example. Thus, frame 1 from image capture device 1, frame 2 from image capture device 2 and frame 3 from image capture device 3, each of which may correspond to being captured and transmitted at the same time $T_1$, are used to explain the automated defect detection in the present disclosure. Moreover, the video images from the three image capture devices may correspond to a single one of the blades 8 within a single one of the stages 6, or alternatively, may correspond to multiple blades within the single stage. In at least some embodiments, the video images may even correspond to multiple ones of the blades 8 from multiple ones of the stages 6. The video images captured by the image capture devices 10 at the step 26 may then be transmitted to the monitoring and analysis site 14 via the communication channel 12, wherein at a step 28, those video images may be processed in a manner described below.

Upon receiving the frames 1, 2 and 3 from the step 26, those frames may be processed at the step 28 by the one or more processing systems 16 of the monitoring and analysis site 14. Specifically, at the step 28, a feature correspondence extraction process may be performed in which certain types of features such as corner-like features, may be extracted to determine any common features between frames by techniques like Harris Corner Detector, SURF (Speeded Up Robust Features) or SIFT (Scale Invariant Feature Transform). Alternatively, a feature correspondence extraction process may be performed in which certain types of features, such as texture-like features, may be extracted to determine any common features between frames by techniques like phase correlation or NCC (Normalized Cross Correlation). All of the aforementioned techniques are well known in the art and, accordingly, for conciseness of expression, they have not been described here. Notwithstanding the fact that in the present embodiment only the Harris Corner, SURF, SIFT, Phase Correlation and NCC techniques for feature extraction have been mentioned, in at least some embodiments other types of techniques that are commonly employed for comparing and extracting similar features between two video frames may be used.

The feature correspondence extraction process may be performed when the fields-of-views (FOV) of the three image capture devices at the step 26 overlap with one another. In other words, a correspondence of features between the frames of the three image capture devices may be found when the FOV of those three image capture devices overlap. By virtue of performing the feature correspondence extraction process when the FOVs of the three image capture devices overlap, image mosaicing techniques to enlarge the two dimensional FOV may be employed to determine defects in the blades 8 corresponding to the sequence of images of the step 26. Thus, at the step 28, the frames 1, 2 and 3 may be processed for determining a feature correspondence between those frames by utilizing one or more of the techniques described above.

Alternatively, in at least some embodiments, the feature correspondence extraction process may be known a priori based on the positioning of the image capture devices 10. For example, in the case of multiple ones of the image capture devices 10 simultaneously imaging multiple ones of the blades 8 in multiple ones of the stages 6, the images may correspond to three spatial dimensions as opposed to the two spatial dimensions described above.

Next, at a step 30, it is determined whether a feature correspondence between the frames 1, 2 and 3 was found. As described above, a feature correspondence between those frames may be found when the FOV of those frames overlap somewhat with one another, or may be known a priori. If a feature correspondence between the frames 1, 2 and 3 is known or found, then the process proceeds to steps 32 and 34. Otherwise, the process proceeds to a step 36, wherein each of the frames 1, 2 and 3 are processed and analyzed independently from one another, as will be described below.

At the steps 32 and 34, a frame-to-frame and a frame-to-mosaic registration, respectively, may be performed in order to create a two dimensional mosaic of the frames 1, 2 and 3. The frame-to-frame registration is described in FIG. 3, while the frame-to-mosaic registration is described in FIG. 4. The frame-to-frame registration may be first applied to find approximate overlap regions between a current frame and its neighboring frame. The frame-to-mosaic registration may then be applied to refine the frame-to-frame registration by aligning the current frame with only the overlap regions between the current frame and the mosaiced image. Thus, the frame-to-frame registration provides a global registration, while the frame-to-mosaic registration provides a local registration, as will be clearer from the discussion below. A three dimensional mosaic, described in more detail below, may also be prepared, in which case the steps 32 and 34 may be skipped.

Figures 3, 4:
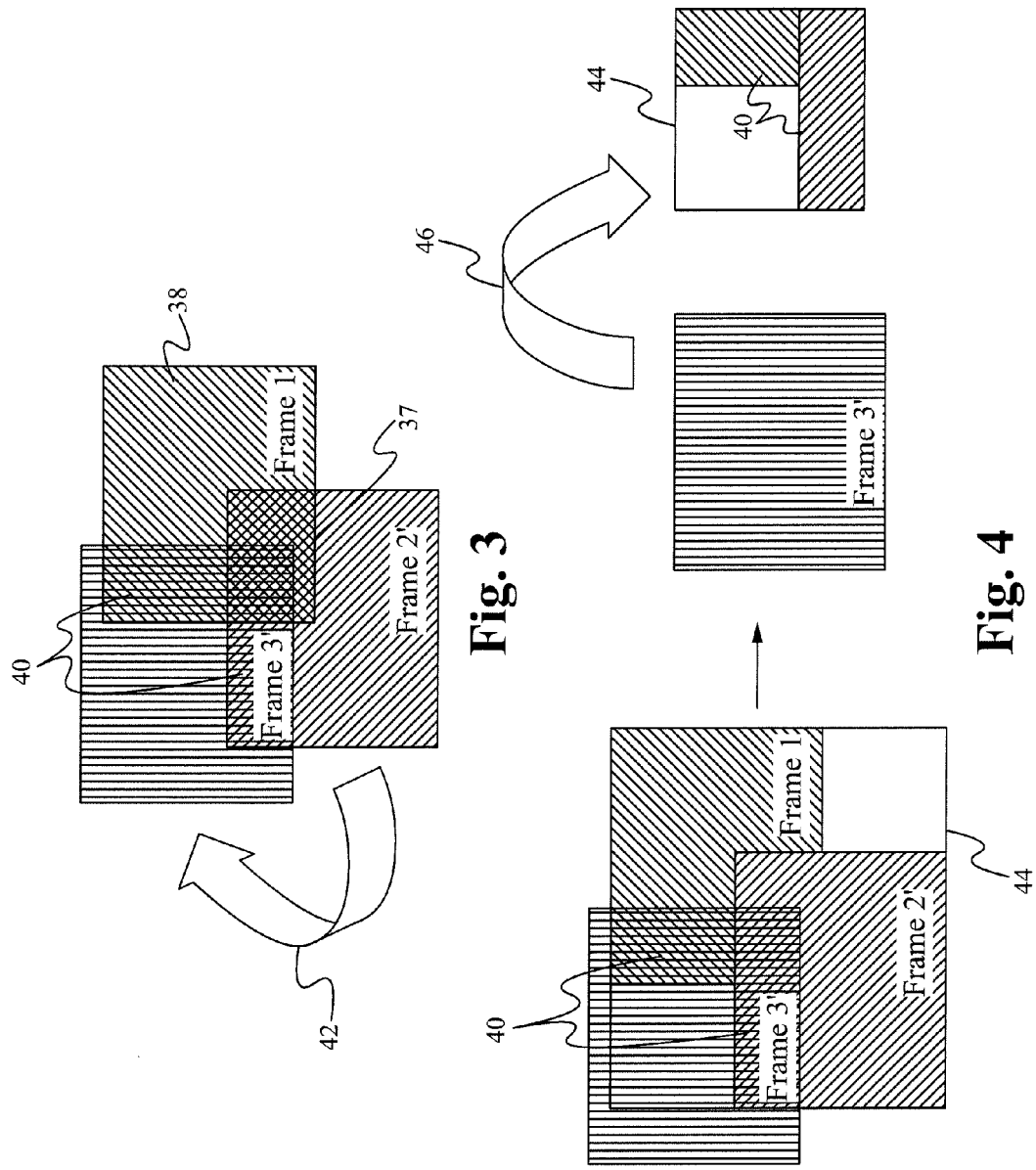
FIG. 3 is a schematic illustration of a frame-to-frame registration employed during the automated defect detection of FIG. 2.
FIG. 4 is a schematic illustration of a frame-to-mosaic registration employed during the automated defect detection of FIG. 2.

Referring now to FIG. 3 in conjunction with FIG. 2, in the frame-to-frame registration, pairs of neighboring frames may be processed and mosaiced together. Thus, a frame may be registered progressively to its neighbor frame. For example, frame 2 may be mosaiced with frame 1, frame 3 may be mosaiced with the mosaiced frame 2, and so on. Accordingly, in the frame-to-frame registration, if some of the features in frame 1 have their corresponding features located in frame 2, then the two frames may be stitched together to create a mosaic. Similarly, if some of the features of the mosaiced frame 2 have their corresponding features in frame 3, then frames 2 and 3 may be stitched and mosaiced together.

Furthermore, any of the frames 1, 2 or 3 may be considered to a reference frame. In the present embodiment, frame 1 is assumed to be the reference frame, such that the frame 2 is registered (e.g., aligned or mosaiced) to frame 1 and then frame 3 is registered to the mosaiced frame 2 and so on. Notwithstanding the fact that in the present embodiment, frame 1 has been employed as the reference frame, it will be understood that in other embodiments, any of the frames 2 or 3 may also be employed as the reference frame and the mosaicing may then be performed relative to that reference frame.

Thus, as shown in FIG. 3, the transformation from frame 1 to frame 2 may be found to determine the overlap region 37 between the two frames. After determining the overlap region 37, frames 1 and 2 may be stitched together to obtain a mosaic 38. The mosaic 38 may then be used to determine the approximate overlap regions 40 thereof with frame 3. Accordingly, first a transformation from frame 2 to frame 3 may be performed to determine approximate overlap regions between those two frames and then, as shown by arrow 42, the frame 3 may be registered to the mosaic 38 of frames 1 and 2 to find the overlap regions 40 with both the frames 1 and 2. In at least some embodiments, the frame-to-frame registration may be performed by a motion estimation technique, although in other embodiments, other techniques for determining the overlap regions and for mosaicing the images together may be employed.

In the frame-to-frame registration, with every subsequent registration, an error within the mosaic may accumulate, at least in part due to the inaccuracy of the motion estimation technique. Accordingly, in at least some embodiments, the error of the frame-to-frame registration may be refined by following the frame-to-frame registration with the frame-to-mosaic registration of the step 34, as described in FIG. 4.

Referring now to FIG. 4 along with FIG. 2, as discussed above, the frame-to-mosaic registration may be used to correct some errors in the frame-to-frame registration. The frame-to-frame registration may find the approximate location or overlap regions 40 of the current image (e.g., frame 3) in a mosaic space (represented by rectangle 44), and the frame-to-mosaic registration may transform the current frame (frame 3) to locally register to the corresponding overlap regions 40 in the mosaic space 44, as shown by arrow 46. Thus, while the frame-to-frame registration is a global registration in which the overlap regions between two neighboring frames are determined, the frame-to-mosaic registration is a local registration in which the current frame is registered locally with only the overlap regions determined in the frame-to-frame registration. Thus, the frame-to-mosaic registration may be used to refine the global transformation obtained from the frame-to-frame registration.

Returning back to FIG. 2, after performing the frame-to-frame registration at the step 32 or the frame-to-mosaic registration at the step 34, a 2D mosaic of the frames 1, 2 and 3 may be formed at a step 48. In the case of a three dimensional (3D) mosaic, the mosaicing may comprise a concatenation of the images and the steps 32 and 34 may be skipped. The mosaic (whether 2D or 3D) 48 may then be employed for human inspection or for automated defect detection of the blades corresponding to the frames 1, 2 and 3 at a step 50. In at least some embodiments, a Robust Principal Component Analysis (PCA) technique for performing the automated analysis of the images and detecting defects at the step 50 may be employed. Using the Robust PCA technique, the mosaiced images from the step 48 may be decomposed into a low rank matrix (or a low rank part) and a sparse matrix (or a sparse part). The low rank matrix may contain a normal part or region of that particular mosaiced image, while the sparse matrix may contain an anomaly or defect of that blade image. After separating the mosaiced images into the low rank matrix and the sparse matrix, the sparse matrix may be further processed to confirm whether the data in the sparse matrix corresponds to any physical damages or defects. Notwithstanding the fact that in the present embodiment a Robust PCA technique for performing the automated analysis of the mosaiced images obtained at the step 48 is employed, in other embodiments other techniques suitable for performing such analyses may be employed as well. The process then ends at a step 52 with any defects being detected at the step 50.

Relatedly, if at the step 30, no feature correspondence between the frames 1, 2 and 3 was found and the process moved to the step 36, then at that step, multiple automated defect detection processes (e.g., three independent processes for three frames) may work independently and in parallel to one another to correlate damage across multiple components. As above, each of the automated defect detection processes may be a Robust PCA technique, involving splitting the frames into a low rank matrix and a sparse matrix, wherein the sparse matrix may be further processed to determine any defects. The process then ends at the step 52. The process described above may then again be repeated for any subsequent frames (e.g., frames at time $T_2$, $T_3$, $T_4$, etc.) captured and transmitted by the three image capture devices at the step 26.

INDUSTRIAL APPLICABILITY

In general, the present disclosure sets forth a system and method for performing automated defect detection from images received simultaneously from multiple image capture devices. The received images are then processed to determine a feature correspondence between them. If a feature correspondence is found, then at least one of a frame-to-frame and a frame-to-mosaic registration on those images is performed to obtain a mosaic. The mosaic is then further processed by using automated image processing algorithms to determine any defects in any of the blades corresponding to the input images. On the other hand, if no correspondence of features is found between the incoming images, then each of those images are processed independently using multiple automated image analysis algorithms running in parallel to determine any defects.

Mosaicing of images from multiple image capture devices allows human inspectors to look at one single display instead of multiple displays simultaneously or sequentially, hence saving human inspectors' time and improving performance by providing context compared to using a single image.

Even if mosaicing is not performed (e.g., when no feature correspondence is found), speeding up processing with parallel processing and performing new diagnosis by correlating damages across multiple components also save human inspectors' time and increases detection accuracy.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of performing automated defect detection, the method comprising:
   providing a plurality of image capture devices, the plurality of image capture devices capturing and transmitting a plurality of images of an object;
   determining a feature correspondence between the plurality of images of the plurality of image capture devices;
   creating mosaiced images of the plurality of images if the feature correspondence between the plurality of images of the plurality of image capture devices is found or known; and
   performing at least one of an automated analysis and a manual inspection on the mosaiced images to find defects in the object by using Robust Principal Component Analysis on the mosaiced images to simultaneously decompose the mosaiced images into a low rank matrix representing the object and a sparse matrix representing the defects.

2. The method of claim 1, wherein performing the automated analysis comprises performing a Robust Principal Component Analysis on the mosaiced images to determine any defects therein.

3. The method of claim 2, wherein the Robust Principal Component Analysis comprises:
   decomposing the mosaiced images into a low rank matrix and a sparse matrix; and
   processing the sparse matrix to determine the defects.

4. The method of claim 1, wherein determining the feature correspondence comprises extracting at least one of corner-like features and texture-like features, and a priori known correspondence.

5. The method of claim 4, wherein extracting the corner-like features comprises performing at least one of a Harris Corner Detector, Speeded Up Robust Features, and Scale Invariant Feature Transform, and extracting texture-like features comprises performing at least one of a Phase Correlation and a Normalized Cross Correlation.

6. The method of claim 1, wherein the feature correspondence is found when a field-of-view of the plurality of images overlap.

7. The method of claim 1, wherein creating mosaiced images comprises at least one of:
   performing a frame-to-frame registration of each of the plurality of images of the plurality of image capture devices; and
   performing a frame-to-mosaic registration.

8. The method of claim 7, wherein the frame-to-mosaic registration comprises determining overlap regions between two neighboring ones of the plurality of images.

9. The method of claim 7, wherein the frame-to-mosaic registration comprises registering a current one of the plurality of images with the overlap regions from the frame-to-frame registration.

10. The method of claim 7, wherein the frame-to-mosaic registration corrects errors in the frame-to-frame registration.

11. The method of claim 1, further comprising performing a parallel automated analysis on each of the at least one image if a feature correspondence is not found.

12. A system for performing automated defect detection, the system comprising:
   a plurality of image capture devices for capturing and transmitting video images of one or more components of a machine; and
   a monitoring and analysis site in at least indirect communication with the image capture devices, the monitoring and analysis site capable of performing an automated analysis of the video images, the automated analysis comprising performing at least one of a feature correspondence extraction and using a priori known correspondence, and selectively creating a mosaic of the video images to determine any defects in the one or more components, and performing Robust Principal Component Analysis on the mosaic of video images to simultaneously decompose the mosaiced images into a low rank matrix representing the one or more components and a sparse matrix representing the defects.

13. The system of claim 12, wherein the machine is at least one of an engine and a turbine, each of the engine and the turbine comprising a plurality of stages, each of the plurality of stages having a plurality of blades.

14. The system of claim 12, wherein the monitoring and analysis site is at least one of a remote site and an on-site.

15. The system of claim 12, wherein the video images comprises images of a single one of the one or more components within a single stage of the machine.

16. The system of claim 12, wherein the plurality of image capture devices comprises at least two image capture devices.

17. A method of performing automated defect detection, the method comprising:
   providing a plurality of image capture devices capable of capturing and transmitting a sequence of images of one or more blades of an engine;
   extracting common features from the sequence of images;

performing at least one of a frame-to-frame registration, a frame-to-mosaic registration and a concatenation to create mosaiced images; and performing at least one of an automated analysis and a manual inspection on the sequence of images, the automated analysis comprising performing a Robust Principal Component Analysis on the mosaiced images to simultaneously decompose the mosaiced images into a low rank matrix representing the one or more blades and a sparse matrix representing defects in order to determine any defects in the one or more blades.

18. The method of claim 17, wherein the defects comprises one or more of a type of the defect, a location of the defect, and a size of the defect.

19. The method of claim 18, wherein the type of the defect may be one or more of leading edge defects, erosions, nicks, cracks, dents, and cuts.

20. The method of claim 17, further comprising performing multiple independent automated analysis on the sequence of images if the common features between the sequence of images are not extracted.

* * * * *